US010319134B2

(12) United States Patent
Lee et al.

(10) Patent No.: US 10,319,134 B2
(45) Date of Patent: Jun. 11, 2019

(54) ANIMATION SYSTEM FOR MANAGING SCENE CONSTRAINTS FOR POSE-BASED CACHING

(71) Applicant: Disney Enterprises, Inc., Burbank, CA (US)

(72) Inventors: Gene S. Lee, La Canada, CA (US); Christian Eisenacher, Los Angeles, CA (US); Chung-An Lin, Cerritos, CA (US); Noel Villegas, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 22 days.

(21) Appl. No.: 15/694,580

(22) Filed: Sep. 1, 2017

(65) Prior Publication Data

US 2019/0073742 A1    Mar. 7, 2019

(51) Int. Cl.
*G06T 13/40* (2011.01)
*G06T 1/60* (2006.01)
*G06T 13/80* (2011.01)

(52) U.S. Cl.
CPC ............... *G06T 13/40* (2013.01); *G06T 1/60* (2013.01); *G06T 13/80* (2013.01); *G06T 2213/08* (2013.01)

(58) Field of Classification Search
CPC  G06T 1/60; G06T 13/40; G06T 13/80; G06T 2213/08
See application file for complete search history.

(56) References Cited

U.S. PATENT DOCUMENTS

| 6,536,043 | B1* | 3/2003 | Guedalia ................ H04N 7/147 348/E7.071 |
| 7,124,245 | B1* | 10/2006 | Walton ................ G06F 12/0866 711/113 |
| 2010/0231582 | A1* | 9/2010 | Turun ..................... G06T 13/00 345/419 |
| 2013/0194279 | A1 | 8/2013 | Watt |
| 2014/0108485 | A1 | 4/2014 | Geibel |

(Continued)

OTHER PUBLICATIONS

Andy Lin, et al. "Achieving real-time playback with production rigs", ACM SIGGRAPH 2015 Talks, Los Angeles, California, Aug. 2015, Article No. 11, ACM New York, NY 2015 (Year: 2015).*

(Continued)

*Primary Examiner* — William A Beutel
(74) *Attorney, Agent, or Firm* — Farjami & Farjami LLP

(57) ABSTRACT

According to one implementation, an animation system includes a computing platform having a hardware processor and a system memory storing a software code. The hardware processor executes the software code to receive pose data including rig control values for multiple animation rigs, and to store the rig control values for each animation rig in respective rig control caches identified with the animation rig. The hardware processor also executes the software code to receive constraint data linking one animation rig to one rig control cache identified with any animation rig, receive change data for one rig control value of that linked animation rig, update the rig control value based on the change data, and clear the rig control cache linked with the updated animation rig. Thus, updating any rig control value of an animation rig results in clearing rig control caches linked with that animation rig.

18 Claims, 6 Drawing Sheets

(56) References Cited

U.S. PATENT DOCUMENTS

2015/0022517 A1* 1/2015 Jutan ................ G06T 13/40
345/419
2016/0307353 A1 10/2016 Ligenza

OTHER PUBLICATIONS

"Skeletal Animation." *Wikipedia: The Free Encyclopedia.* Wikimedia Foundation, Inc. Feb. 16, 2017. Web. May 30, 2017. pp. 1-2.
File History of U.S. Appl. No. 15/282,264, filed Sep. 30, 2016.

* cited by examiner

ANIMATION SYSTEM FOR MANAGING SCENE CONSTRAINTS FOR POSE-BASED CACHING

BACKGROUND

In animation, a pose of an animation rig is defined by a collection of rig controls, which are typically the interactive handles or the keyable attributes of the animation rig. Those rig controls can be expensive to compute and are most efficiently accessed by caching their values in rig control caches. In the absence of scene constraints, the mapping of rig controls to rig control caches is typically one-to-one and self-contained within a single animation rig. As a result, when the animation of rig controls are modified in such cases, their corresponding rig control caches are easily reset.

However, when constraints are added to a scene, the mapping of rig controls to rig control caches ceases to be one-to-one, and the mapping frequently crosses animation rig boundaries. That is to say, when scene constraints are introduced, a single rig control may be mapped to multiple rig control caches of several different animation rigs. Consequently, the introduction of scene constraints makes it more difficult to determine what rig control caches should be reset and when those resets should occur. Moreover, the complexity produced by the introduction of scene constraints is compounded when the constraints relate the state of one animation rig to the rig control cache of another animation rig.

SUMMARY

There are provided systems and methods for managing scene constraints for pose-based caching, substantially as shown in and/or described in connection with at least one of the figures, and as set forth more completely in the claims.

DETAILED DESCRIPTION

Figure 1:
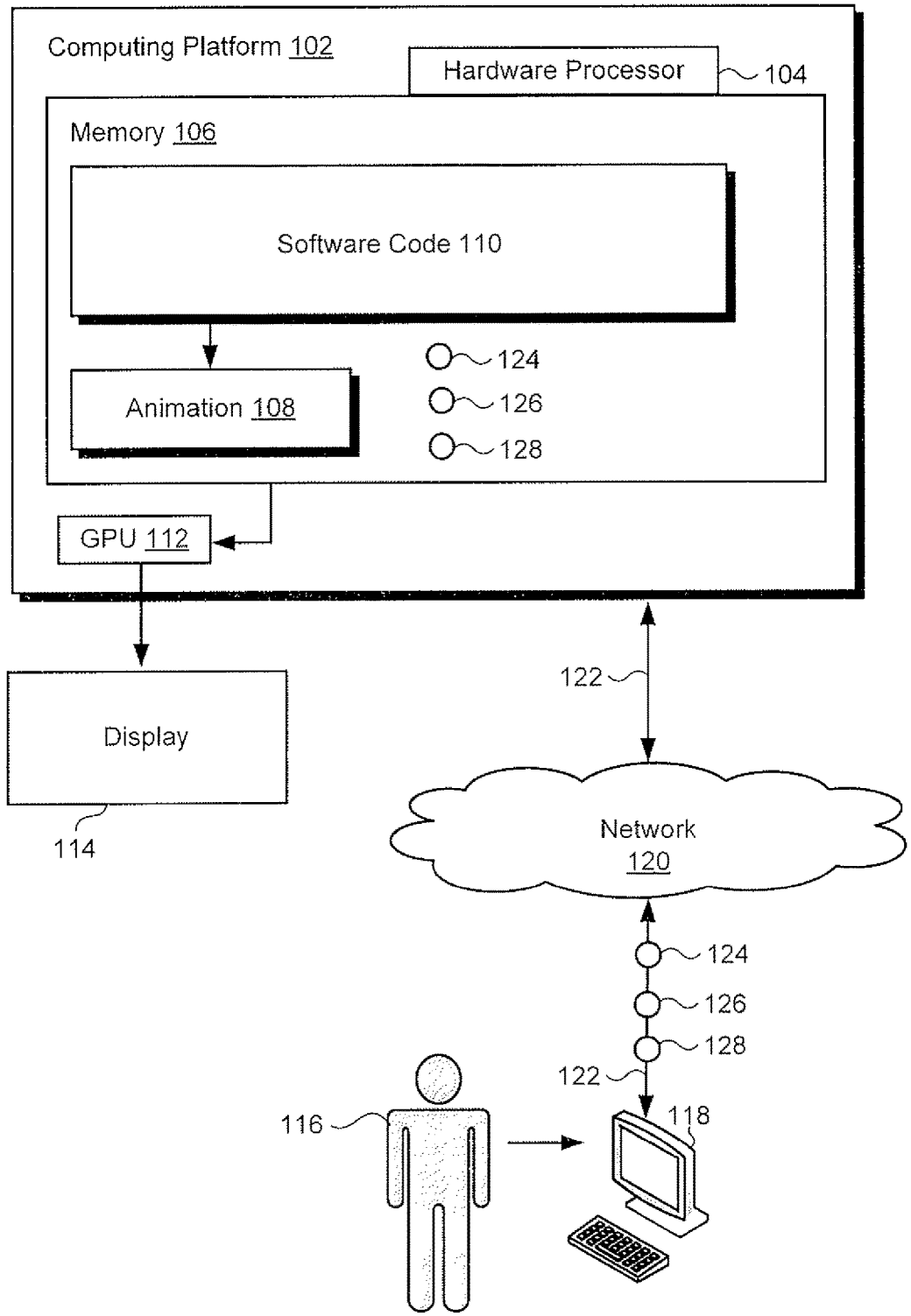
FIG. 1 shows an exemplary animation system for managing scene constraints for pose-based caching, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

In the creation of animated images, posed-based caching may be used to enable real-time playback of animation rigs. In such a process, a corresponding geometry is computed for every distinct pose, and both the geometry and the pose are cached. During playback of the animation rigs, the cached results can advantageously be drawn in real-time. Nevertheless, a significant challenge associated with cache use is accurately predicting when the values stored in a cache need to be reset. For example, caches may require updating when animation is changed.

As used herein, a "pose" refers to a particular combination or configuration of rig control values corresponding to an animation rig. For example, for an animated character having 3000 rig control values, a pose may comprise 3000 values that define an output shape of the character. Moreover, and as stated above, rig controls, are typically the interactive handles or the keyable attributes of the animation rig. These controls can be expensive to compute and are most efficiently accessed by caching their values in rig control caches (hereinafter "RC-caches"). In the absence of scene constraints, the mapping of rig controls to RC-caches is typically one-to-one and self-contained within a single animation rig. As a result, when the animation of rig controls is modified in such cases, their corresponding RC-caches are easily reset.

However, and as further stated above, when constraints are added to a scene, the mapping of rig controls to RC-caches ceases to be one-to-one, and the mapping frequently crosses animation rig boundaries. That is to say, when scene constraints are introduced, a single rig control may be mapped to multiple RC-caches of several different animation rigs. Consequently, the introduction of scene constraints makes it more difficult to determine what RC-caches should be reset and when those resets should occur.

The increased complexity resulting from the introduction of scene constraints is compounded when the constraints relate the "state" of one animation rig to the RC-cache of another animation rig. Animation rig state is the byproduct of one or more rig controls, although in practice, animation rig state is typically the byproduct of a very large number of rig controls. For instance, a scene constraint may set the position of a hand of one animation rig to substantially match the position of a locator found on the surface of another animation rig, where the locator is simply a passive marker that is not itself bound to any pose control. When such a situation arises, it is often unclear which rig controls should be applied to reset the cache of the hand. Any number of controls could directly or indirectly alter the shape and location of the surface underneath the locator.

It is noted that a scene may include props as well as animation rigs. A prop is normally a scene object without rigging elements. In other words without rigging elements such as a skeleton or deformation controls. The controls for a prop normally modify only its position and orientation. Those simple prop controls can be used by a scene constraint to modify an animation rig. For example, the position of a prop in the form of a coffee cup can drive the position of a hand of an animated character holding the coffee cup. However, it is also noted that a prop can be promoted to animation rig status if rigging elements are added to it. Consequently, the term "animation rig," as used in the present application may refer to a character animation rig, or to a prop animation rig corresponding to a prop to which rigging elements have been added. Moreover, the solutions for managing scene constraints disclosed in the present application can be applied to props as well as to animation rigs.

The present application discloses solutions for managing scene constraints for pose-based caching that address and overcome the deficiencies in the conventional art described above. By generating an invalidation graph that maps an entire animation rig to one or more individual RC-caches affected by any one rig control value of that animation rig, the present solution links the animation rig to any RC-cache potentially affected by its pose. In addition, by clearing each linked RC-cache in response to the updating of any rig control value of its linked animation rig, the present solution advantageously ensures that all RC-caches requiring a reset are timely placed in a condition for being updated.

FIG. 1 shows exemplary animation system 100, according to one implementation. As shown in FIG. 1, animation system 100 is implemented in an environment including communication network 120, display 114, workstation terminal 118, and animator or user 116 utilizing workstation terminal 118. As further shown in FIG. 1, animation system 100 includes computing platform 102 having system processor 104, implemented as a hardware processor (hereinafter "hardware processor 104"), graphics processing unit (GPU) 112, and system memory 106 implemented as a non-transitory storage device for storing software code 110 and animation 108.

Also shown in FIG. 1 are network communication links 122 interactively connecting workstation terminal 118 and animation system 100 via communication network 120, pose data 124, constraint data 126, and change data 128. It is noted that, as shown in FIG. 1, pose data 124, constraint data 126, and change data 128 may be received by animation system 100 via communication network 120 and network communication links 122. It is further noted that, as further shown by FIG. 1, subsequent to being received by animation system 100, pose data 124, constraint data 126, and change data 128 may be stored in system memory 106.

It is also noted that computing platform 102 of animation system 100 may be implemented using one or more computer servers, which may be co-located, or may form an interactively linked but distributed system. For example, animation system 100 may be a cloud-based animation system. As a result, hardware processor 104 and system memory 106 may correspond to distributed processor and memory resources of media content annotation system 100. Thus, it is to be understood that although animation 108 and software code 110 are depicted as being stored together in system memory 106, in other implementations, those assets may be stored remotely from one another and/or may be executed using the distributed processor resources of animation system 100.

According to the implementation shown by FIG. 1, user 116 may utilize workstation terminal 118 to interact with animation system 100, over communication network 120. In one such implementation, animation system 100 may correspond to one or more web servers, accessible over a packet-switched network such as the Internet, for example. Alternatively, animation system 100 may correspond to one or more computer servers supporting a local area network (LAN), or included in another type of limited distribution network. Moreover, in some implementations, communication network 120 may be a high-speed network suitable for high performance computing (HPC), for example a 10 GigE network or an Infiniband network.

Although workstation terminal 118 is shown as a personal computer (PC) in FIG. 1, that representation is also provided merely as an example. In other implementations, workstation terminal 118 may be any other suitable mobile or stationary computing device or system. For instance, in some implementations, workstation terminal 118 may correspond to a laptop computer, tablet computer, or smartphone, to name a few examples.

User 116 may utilize workstation terminal 118 to direct the operation of animation system 100, and to execute software code 110, under the control of hardware processor 104, to produce animation 108. Animation 108 may then be output to display 114 through GPU 112. It is noted that display 114 may take the form of a liquid crystal display (LCD), a light-emitting diode (LED) display, an organic light-emitting diode (OLED) display, or another suitable display screen that performs a physical transformation of signals to light.

Figure 2:
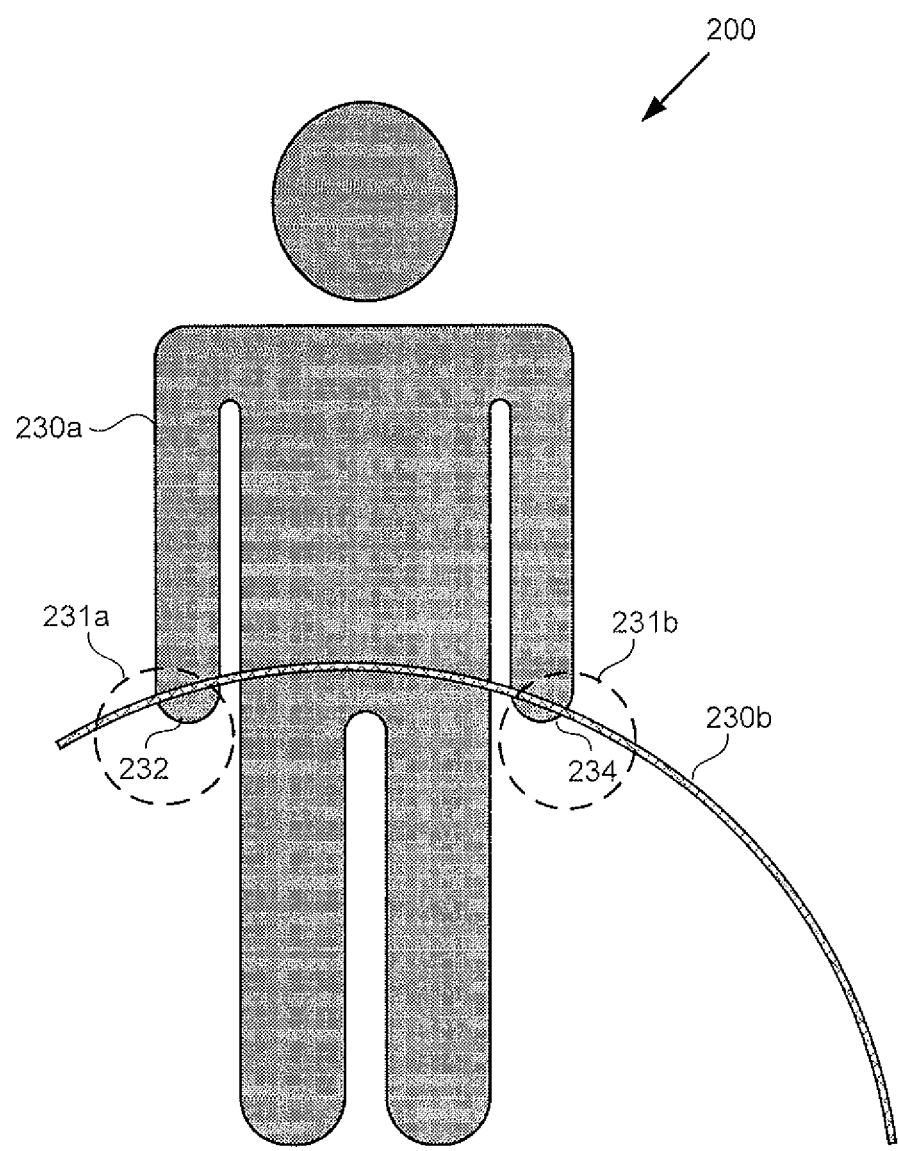
FIG. 2 shows an exemplary diagram of two scene constrained animation rigs, according to one implementation.

FIG. 2 shows exemplary diagram 200 of two scene constrained animation rigs 230a and 230b, according to one implementation. The example implementation shown by FIG. 2 includes character animation rig 230a in the form of a human like figure (hereinafter "character 230a"), and prop animation rig 230b in the form of a rope (hereinafter "rope 230b"). Also shown in FIG. 2 are right hand 232 and left hand 234 of character 230a, which are each shown to be holding rope 230b based on respective constraints 231a and 231b. That is to say, constraint 231a causes right hand 232 of character 230a to hold rope 230b, while constraint 231b causes left hand 234 of character 230a to hold rope 230b.

Figure 3:
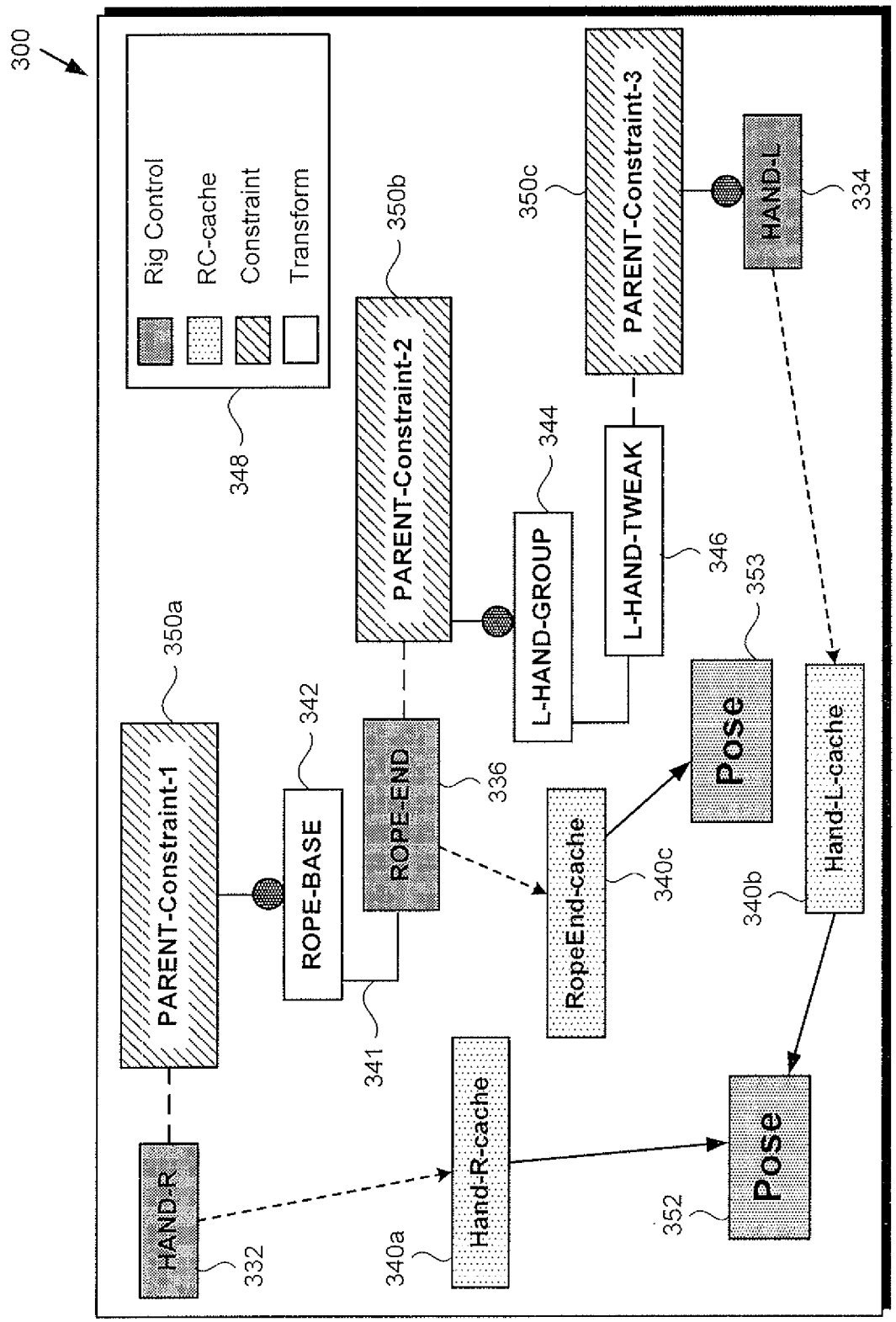
FIG. 3 shows an exemplary diagram of an object hierarchy including scene constraints and corresponding to the constrained animation rigs of FIG. 2.

Referring to FIG. 3, diagram 300 depicts the connections and object hierarchies of three parent constraints 350a, 350b, and 350c from FIG. 2. In addition to parent constraints 350a, 350b, and 350c, diagram 300 includes right hand rig control 332 for right hand 232 of character 230a, left hand rig control 334 for left hand 234 of character 230a, and rope end rig control 336 for rope 230b. FIG. 3 further shows transforms 342, 344, and 346, RC-caches 340a, 340b, and 340c, key 348 identifying the objects included in FIG. 3 by fill pattern, and pose 352 resulting from the application of parent constraints 350a, 350b, and 350c to character 230a and rope 230b. Also shown in FIG. 3 are exemplary relationship 341 coupling rope base transform 342 to rope end rig control 336 and another pose 353 coupled to RC-cache 340c.

Each of parent constraints 350a, 350b, and 350c allows objects in separate hierarchies to form a temporary parent-child relationship. For example, parent constraint 350a tightly parents rope base 342 of rope 230b to right hand 232 of character 230a via right hand rig control 332, while parent constraints 350b and 350c parent rope end 336 of rope 230b to left hand 234 of character 230a via left hand rig control 334. Left hand tweak transform 346 situated between parent constraints 350b and 350c permits left hand 234 of character 230a to hold rope 230b loosely.

The dashed arrows in diagram 300 show the one-to-one mapping of rig controls 332, 334, and 336 to their corresponding RC-caches. That is to say, right hand rig control 332 maps to right hand cache 340a, left hand rig control 334 maps to left hand cache 340b, and rope end rig control 336 maps to rope end cache 340c.

Figure 4:
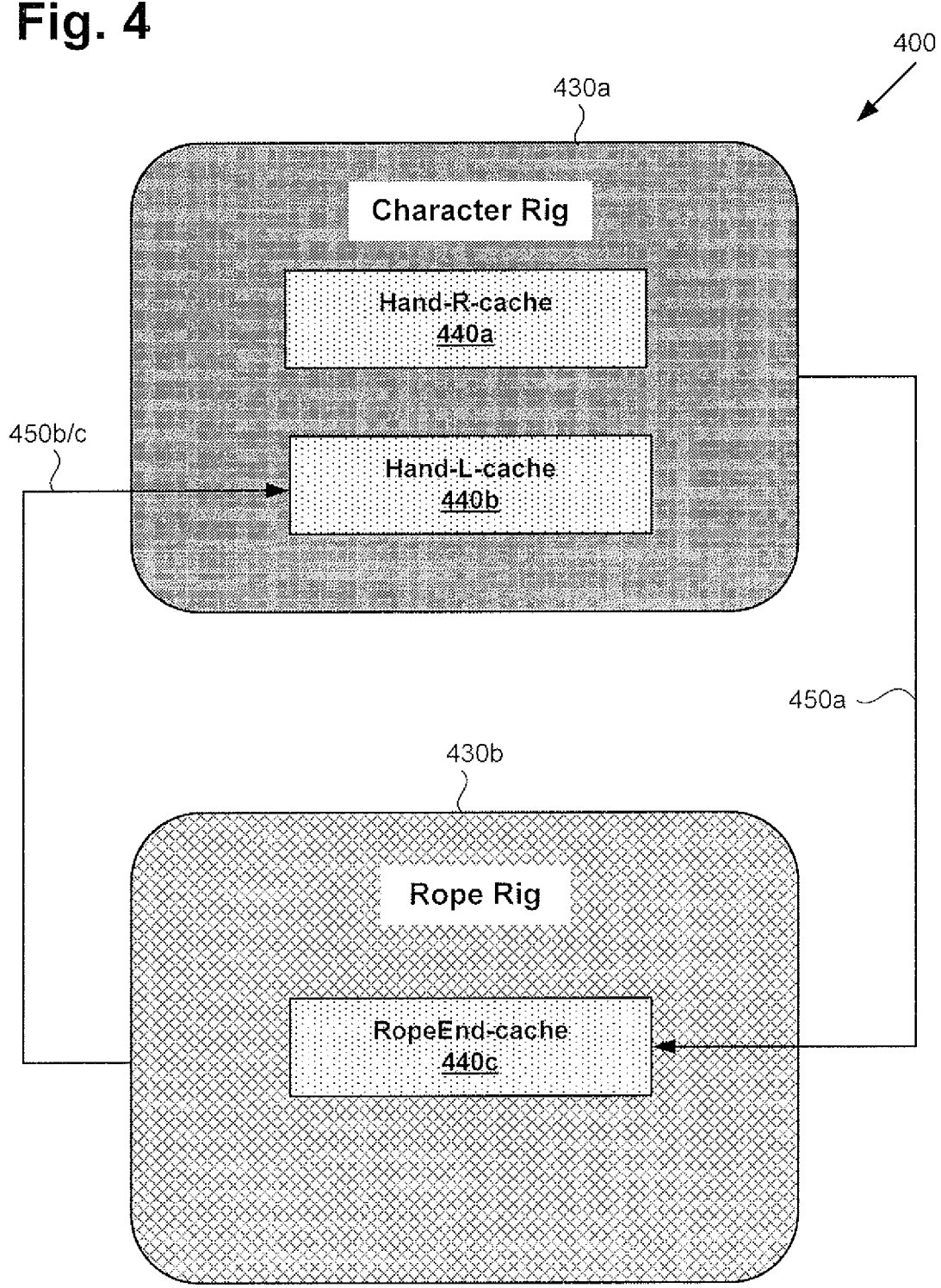
FIG. 4 shows an exemplary invalidation graph for managing the scene constraints represented in FIGS. 2 and 3.

FIG. 4 shows exemplary invalidation graph 400 for managing the scene constraints represented in FIGS. 2 and 3. As shown in FIG. 4, invalidation graph 400 includes character rig 430a corresponding to character 230a, in FIG. 2, rope rig 430b corresponding to rope 230b, in FIG. 2, scene constraint 450a corresponding to parent constraint 350a, in FIG. 3, and scene constraint 450b/c corresponding to parent constraints 350b and 350c, in FIG. 3. Also shown in FIG. 4 are right hand cache 440a and left hand cache 440b identified with character rig 430a, and rope end cache 440c identified with rope rig 430b, which correspond respectively to right hand cache 330a, left hand cache 330b, and rope end cache 330c, in FIG. 3.

The directed arcs represented by scene constraints 450a and 450b/c and linking character rig 430a and rope rig 430b to RC-caches are set by searching the object hierarchy shown in FIG. 3 for the first rig controls that are present upstream and downstream from the scene constraint. For example, for parent constraint 350a, the first upstream rig control is right hand rig control 332, and the first downstream rig control is rope end rig control 336. Thus, scene constraint 450a links character rig 430a, which includes right hand rig control 332, to rope end cache 440c identified with rope rig 430b. Analogously, for both of parent constraints 350b and 350c, the first upstream rig control is rope end rig control 336, and the first downstream rig ti control is left hand rig control 334. Thus, scene constraint 450b/c links rope rig 430b, which includes rope end rig control 336, to left hand cache 440b identified with character rig 430a.

It is noted that a search path for identifying upstream and downstream rig controls of a particular scene constraint can pass through other scene constraints. For example, referring to FIG. 3, identifying the first downstream rig control for parent constraint 350b involves passing through parent constraint 350c. In addition, such search paths may pass through connections among other elements of diagram 300, as well as through hierarchical relationships, such as relationship 341 coupling rope base transform 342 to rope end rig control 336.

It is emphasized that, according to the present inventive principles, scene constraints 450a and 450b/c do not link individual RC-caches with one another. It is also emphasized that scene constraints 450a and 450b/c do not link rig controls to individual RC-caches. Rather, each of scene constraints 450a and 450b/c links an entire animation rig to a particular RC-cache identified with that, or another, animation rig. Consequently, any change to an animation rig can affect the RC-cache to which it is linked.

Figure 5:
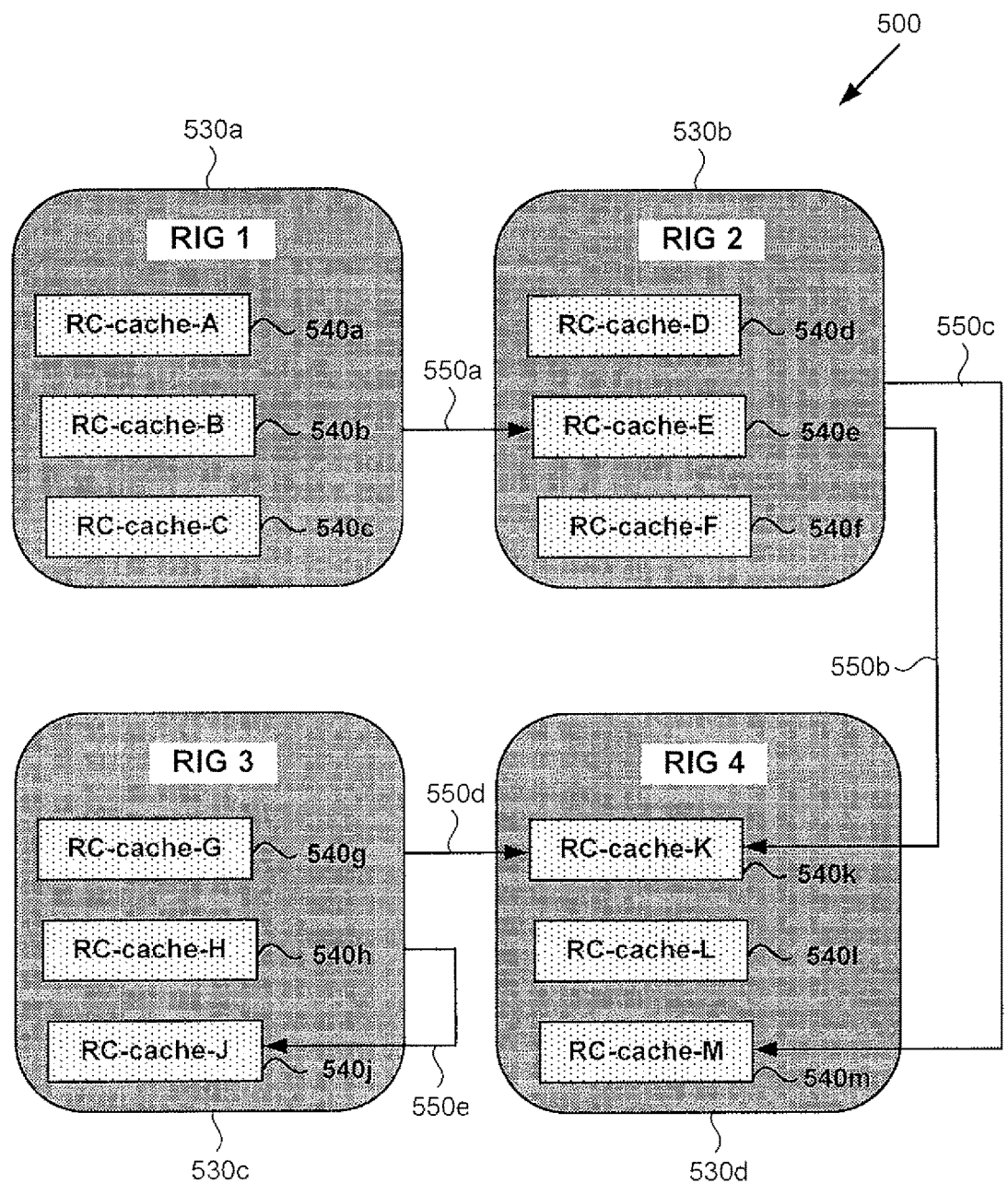
FIG. 5 shows a more complex invalidation graph for managing scene constraints for pose-based caching, according to another exemplary implementation.

FIG. 5 shows more complex invalidation graph 500 for managing scene constraints for pose-based caching, according to another exemplary implementation. As shown in FIG. 5, invalidation graph 500 includes first animation rig 530a, second animation rig 530b, third animation rig 530c, and fourth animation rig 530d (hereinafter "animation rigs 530a-530d"). Also shown in FIG. 5 are RC-cache-A 540a, RC-cache-B 540b, and RC-cache-C 540c identified with first animation rig 530a, RC-cache-D 540d, RC-cache-E 540e, and RC-cache-F 540f identified with second animation rig 530b, RC-cache-G 540g, RC-cache-H 540h, and RC-cache-J 540j identified with third animation rig 530c, and RC-cache-K 540k, RC-cache-L 5401, and RC-cache-M 540m identified with fourth animation rig 530d.

In addition, invalidation graph 500 includes scene constraints 550a, 550b, 550c, 550d, and 550e (hereinafter "scene constraints 550a-550e") each linking an animation rig to a particular RC-cache. For example, scene constraint 550a links first animation rig 530a to RC-cache-E 540e identified with second animation rig 530b, while scene constraints 550b and 550c link second animation rig 530b to respective RC-cache-K 540k and RC-cache-M 540m identified with fourth animation rig 530d. Moreover, scene constraint 550d links third animation rig 530c to RC-cache-K 540k of fourth animation rig 530d, while scene constraint 550e links third animation rig 530c to RC-cache-J 540j identified with third animation rig 530c.

It is noted that a self referencing scene constraint, such as scene constraint 550e, can occur when the scene constraint links one animation rig control of an animation rig to another rig control of the same animation rig, such as through the clasping of hands, for example. However, It is reiterated that, according to the present inventive principles, scene constraints 550a-550e do not link individual RC-caches with one another. Rather, each of scene constraints 550a-550e links an entire animation rig to a particular RC-cache identified with that, or another, animation rig. Consequently, any change to any RC-cache identified with an animation rig can affect the RC-cache to which that animation rig is linked.

It is also noted that the directed arcs represented by scene constraints 550a-550e are set in a manner corresponding to that described above with reference to scene constraints 450a and 450b/c, in FIG. 4. In other words, the directed arcs represented by scene constraints 550a-550e are set by searching an object hierarchy corresponding to invalidation graph 500 for the first rig controls that are present upstream and downstream from each scene constraint.

It is further noted that, as shown by FIG. 5, when multiple animation rigs and multiple scene constraints are present, a single rig control update can cascade into a series of RC-cache clears and multiple updates. For instance, a change to any rig control value stored in RC-cache-A 540a, RC-cache-B 540b, or RC-cache-C 540c identified with first animation rig 530a results in clearing of RC-cache-E 540e identified with second animation rig 530b, which causes RC-cache-E 540e to be updated, which in turn results in clearing of RC-cache-K 540k and RC-cache-M 540m identified with fourth animation rig 530d.

Figure 6:
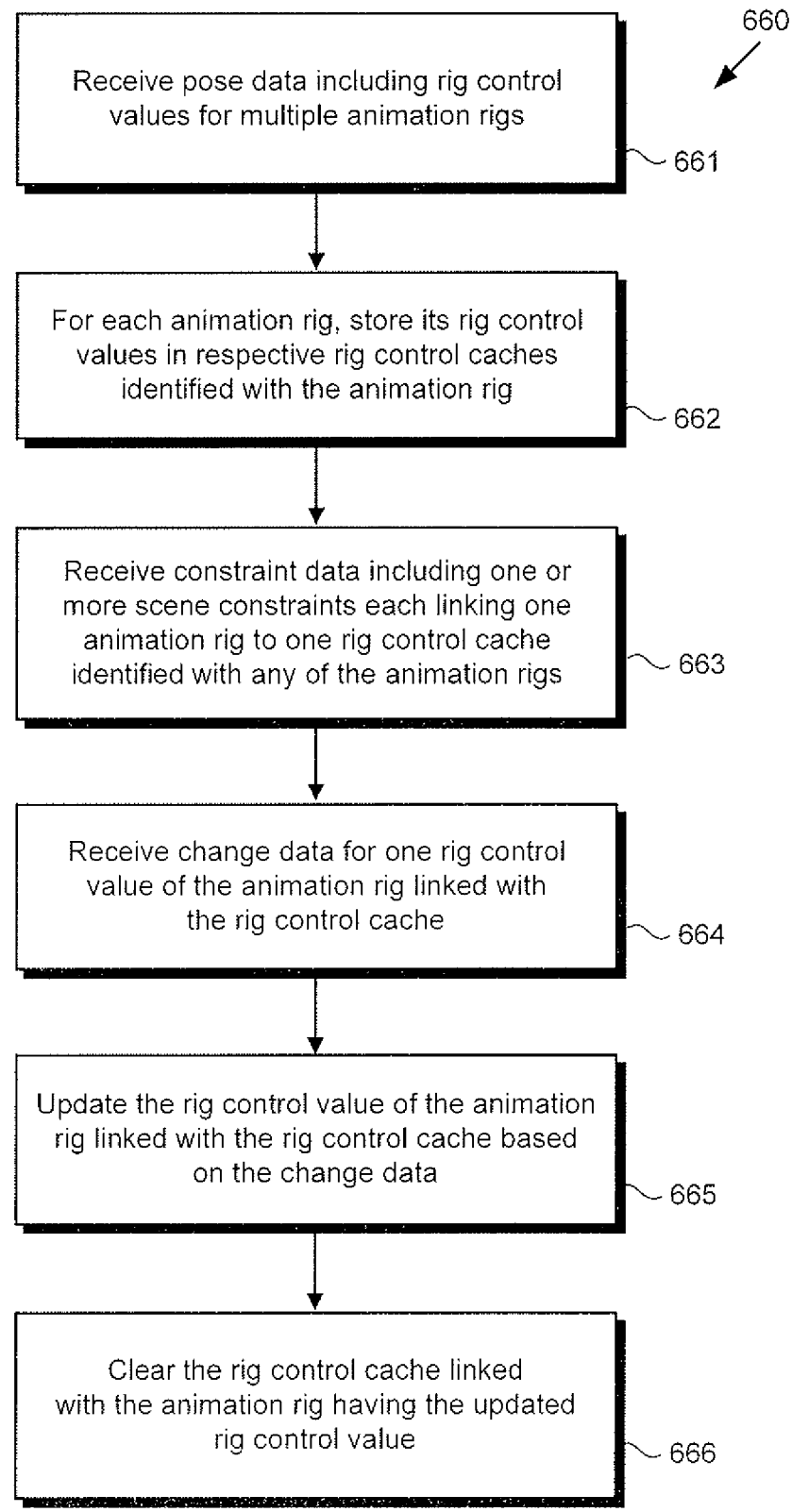
FIG. 6 shows a flowchart presenting an exemplary method for managing scene constraints for pose-based caching, according to one implementation.

The functionality of animation system 100 will be further described by reference to FIG. 6 in combination with exemplary invalidation graph 500 of FIG. 5. FIG. 6 shows flowchart 660 presenting an exemplary method for managing scene constraints for pose-based caching, according to one implementation. With respect to the method outlined in FIG. 6, it is noted that certain details and features have been left out of flowchart 660 in order not to obscure the discussion of the inventive features in the present application.

Flowchart 660 begins with receiving pose data 124 including rig control values for each of multiple animation rigs 530a-530d (action 661). By way of example, user 116 may utilize workstation terminal 118 to interact with animation system 100 in order to produce animation 108. In one implementation, user 116 may do so by transmitting pose data 124 from workstation terminal 118 to animation system 100 via communication network 120 and network communication links 122. Alternatively, pose data 124 may be stored in system memory 106. Pose data 124 may be received by software code 110 of animation system 100, executed by hardware processor 104.

Flowchart 660 continues with, for each animation rig 530a-530d, storing its rig control values in respective RC-caches identified with the animation rig. (action 662). For example, and as noted above, RC-cache-A 540a, RC-cache-B 540b, and RC-cache-C 540c are identified with first animation rig 530a. Thus, rig control values for first animation rig 530a and included in pose control data 124 are stored in RC-caches 540a, 540b, and 540c. That is to say, a rig control value for rig control A of first animation rig 530a and included in pose data 124 is stored in RC-cache-A 540a identified with first animation rig 530b. Similarly, rig control values for rig controls B and C of first animation rig 530a and included in pose data 124 are stored in respective RC-cache-B 540b and RC-cache-C 540c identified with first animation rig 530b.

By analogy, rig control values for second animation rig 530b and included in pose control data 124 are stored in RC-caches 540d, 540e, and 540f, rig control values for third animation rig 530c and included in pose control data 124 are stored in RC-caches 540g, 540h, and 540j, and rig control values for fourth animation rig 530d and included in pose control data 124 are stored in RC-caches 540k, 540l, and 540m. Storing of rig control values for each of animation rigs 530a-530d in RC-caches identified with those respective animation rigs 530a-530d may be performed by software code 110 of animation system 100, executed by hardware processor 104.

Flowchart 660 continues with receiving constraint data 126 including at least one scene constraint linking one of animation rigs 530a-530d to one RC-cache identified with any of animation rigs 530a-530d (action 663). For example, and as represented in FIG. 5, constraint data 126 may include scene constraint 550a linking first animation rig 530a to RC-cache-E 540e identified with second animation rig 530b. Thus, in some instances, the RC-cache to which an animation rig is linked may be identified with another animation rig.

In addition, and as also represented in FIG. 5, constraint data 126 may include scene constraint 550b linking second animation rig 530b to RC-cache-K 540k identified with fourth animation rig 530d, and may further include scene constraint 550c linking second animation rig 530b to RC-cache-M 540m identified with fourth animation rig 530d. Thus, in some instances, an animation rig may be linked to more than one RC-cache identified with another animation rig. Moreover, in some instances, an animation rig may be linked to more than one RC-cache identified with one or more others of animation rigs 530a-530d.

Alternatively, and as noted above, in some instances, an animation rig may be linked to an RC-cache identified with itself. Thus, for example, and as represented in FIG. 5, constraint data 126 may include scene constraint 550e linking third animation rig 530c to RC-cache-J 540j identified with third animation rig 530c. Constraint data 126 may be received by software code 110 of animation system 100, executed by hardware processor 104.

Flowchart 660 continues with receiving change data 128 for one rig control value of the animation rig linked to the RC-cache (action 664). For example, as noted above, scene constraint 550a links first animation rig 530a to RC-cache-E 540e identified with second animation rig 530b. Thus, action 664 can correspond to receiving change data 128 for a rig control value stored in any one of RC-caches 540a, 540b, or 540c identified with first animation rig 530a.

Analogously, and as also noted above, scene constraint 550b links second animation rig 530b to RC-cache-K 540k identified with fourth animation rig 530d, while scene constraint 550c links second animation rig 530b to RC-cache-M 540m identified with fourth animation rig 530d. Consequently, action 664 can correspond to receiving change data 128 for a rig control value stored in any one of RC-caches 540d, 540e, or 540f identified with second animation rig 530b. Change data 128 may be received by software code 110 of animation system 100, executed by hardware processor 104.

Flowchart 660 continues with updating the rig control value of the animation rig linked with the RC-cache based on change data 128 (action 665). That is to say, action 665 updates the rig control value for which change data 128 is received in action 664. The updating of the rig control value of the animation rig linked with the RC-cache based on change data 128 may be performed by software code 110 of animation system 100, executed by hardware processor 104.

Flowchart 660 can conclude with clearing the RC-cache linked with the animation rig having the updated rig control value (action 666). Referring once again to the examples shown in FIG. 5, RC-cache-E 540e identified with second animation rig 530b is linked with first animation rig 530a. Consequently, where a rig control value stored in any one of RC-caches 540a, 540b, or 540c identified with first animation rig 530a is updated, RC-cache-E 540e identified with second animation rig 530b is cleared.

Analogously, both RC-cache-K 540k and RC-cache-M 540m identified with fourth animation rig 530d are linked with second animation rig 530b. Consequently, where a rig control value stored in any one of RC-caches 540d, 540e, or 540f identified with second animation rig 530b is updated, RC-caches 540k and 540m identified with fourth animation rig 530d are cleared.

As an additional example, RC-cache-J 540j identified with third animation rig 530c is further linked with third animation rig 530c. Thus, where a rig control value stored in either of RC-caches 540g or 540h identified with third animation rig 530c is updated, RC-cache-J 540j also identified with third animation rig 530c is cleared. Clearing of the RC-cache linked with the animation rig having the updated rig control value may be performed by software code 110 of animation system 100, executed by hardware processor 104.

In some implementations, hardware processor 104 may further execute software code 110 to, after clearing the RC-cache linked with the animation rig having the updated rig control value, update that cleared RC-cache as well. For example, after being cleared as a result of any one of RC-caches 540a, 540b, or 540c identified with first animation rig 530a being updated, cleared RC-cache-E 540e identified with second animation rig 530b can be updated. Analogously, after being cleared as a result of any one of RC-caches 540d, 540e, or 540f identified with second animation rig 530b being updated, cleared RC-caches 540k and 540m identified with fourth animation rig 530d can be updated.

Moreover, and as noted above, a single rig control update can cascade into a series of RC-cache clears and multiple updates. For example, a change to any rig control value stored in RC-caches 540a, 540b, or 540c identified with first animation rig 530a results in clearing of RC-cache 540e identified with second animation rig 530b, which causes RC-cache 540e to be updated, which in turn results in clearing of RC-caches 540k and 540m identified with fourth animation rig 530d.

Thus, the present application discloses solutions for managing scene constraints for pose-based caching. By generating an invalidation graph that maps an entire animation rig to one or more individual RC-caches affected by any one rig control value of that animation rig, the present solution links the animation rig to any RC-cache potentially affected by its pose. In addition, by clearing each linked RC-cache in response to the updating of any rig control value of its linked animation rig, the present solution advantageously ensures that all RC-caches requiring a reset are timely placed in a condition for being updated.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An animation system comprising:
a computing platform including a hardware processor and a system memory storing a software code;
the hardware processor configured to execute the software code to:
receive a pose data including rig control values for each of a plurality of animation rigs;
for each animation rig, store its rig control values in respective rig control caches identified with the animation rig;
receive a constraint data linking one animation rig to one rig control cache identified with any of the plurality of animation rigs, the constraint data further linking the one animation rig to at least another rig control cache identified with any of the plurality of animation rigs;
receive a change data for one rig control value of the one animation rig;
update the one rig control value based on the change data; and
clear the one rig control cache linked with the one animation rig;
wherein updating any rig control value of the one animation rig results in clearing the one rig control cache and the at least another rig control cache linked with the one animation rig.

2. The animation system of claim 1, wherein the one rig control cache linked with the one animation rig is also identified with the one animation rig.

3. The animation system of claim 1, wherein the one rig control cache linked with the one animation rig is identified with another of the plurality of animation rigs.

4. The animation system of claim 1, wherein the hardware processor is further configured to execute the software code to, after the one rig control cache is cleared, update the one rig control cache.

5. The animation system of claim 1, wherein the one rig control cache and the at least another rig control cache are identified with a same animation rig of the plurality of animation rigs.

6. The animation system of claim 1, wherein the one rig control cache and the at least another rig control cache are identified with different animation rigs of the plurality of animation rigs.

7. The animation system of claim 1, wherein the hardware processor is further configured to execute the software code to, after the one rig control cache and the at least another rig control cache are cleared, update the one rig control cache and the at least another rig control cache.

8. An animation system comprising:
a computing platform including a hardware processor and a system memory storing a software code;
the hardware processor configured to execute the software code to:
receive a pose data including rig control values for each of a plurality of animation rigs;
for each animation rig, store its rig control values in respective rig control caches identified with the animation rig;
receive a constraint data linking one animation rig to one rig control cache identified with any of the plurality of animation rigs;
receive a change data for one rig control value of the one animation rig;
update the one rig control value based on the change data; and
clear the one rig control cache linked with the one animation rig;
wherein updating any rig control value of the one animation rig results in clearing the one rig control cache linked with the one animation rig, and wherein the constraint data further links an animation rig identified with the one rig control cache to another rig control cache identified with another animation rig, and wherein updating any rig control value of the one animation rig results in clearing the another rig control cache identified with the another animation rig.

9. The animation system of claim 8, wherein the one animation rig is a first animation rig of the plurality of animation rigs, the animation rig identified with the one rig control cache is a second animation rig, and the another animation rig is a third animation rig.

10. A method for use by an animation system including a computing platform having a hardware processor and a system memory storing a software code, the method comprising:
receiving, using the hardware processor, a pose data including rig control values for each of a plurality of animation rigs;
for each animation rig, storing, using the hardware processor, its rig control values in respective rig control caches identified with the animation rig;
receiving, using the hardware processor, a constraint data linking one animation rig to one rig control cache identified with any of the plurality of animation rigs, the constraint data further linking the one animation rig to at least another rig control cache identified with any of the plurality of animation rigs;
receiving, using the hardware processor, a change data for one rig control value of the one animation rig;
updating, using the hardware processor, the one rig control value based on the change data; and
clearing, using the hardware processor, the one rig control cache linked with the one animation rig;
wherein updating any rig control value of the one animation rig results in clearing the one rig control cache and the at least another rig control cache linked with the one animation rig.

11. The method of claim 10, wherein the one rig control cache linked with the one animation rig is also identified with the one animation rig.

12. The method of claim 10, wherein the one rig control cache linked with the one animation rig is identified with another of the plurality of animation rigs.

13. The method of claim 10, further comprising updating, after the one rig control cache is cleared, the one rig control cache.

14. The method of claim 10, wherein the one rig control cache and the at least another rig control cache are identified with a same animation rig of the plurality of animation rigs.

15. The method of claim 10, wherein the one rig control cache and the at least another rig control cache are identified with different animation rigs of the plurality of animation rigs.

16. The method of claim 10, further comprising updating, after the one rig control cache and the at least another rig control cache are cleared, the one rig control cache and the at least another rig control cache.

17. The method of claim 10, wherein the constraint data further links an animation rig identified with the one rig control cache to another rig control cache identified with another animation rig, and wherein updating any rig control value of the one animation rig results in clearing the another rig control cache identified with the another animation rig.

18. The method of claim 17, wherein the one animation rig is a first animation rig of the plurality of animation rigs, the animation rig identified with the one rig control cache is a second animation rig, and the another animation rig is a third animation rig.

\* \* \* \* \*